(No Model.)
T. W. HEERMANS.
ELEVATOR VALVE CONTROLLER.
No. 369,936. Patented Sept. 13, 1887.
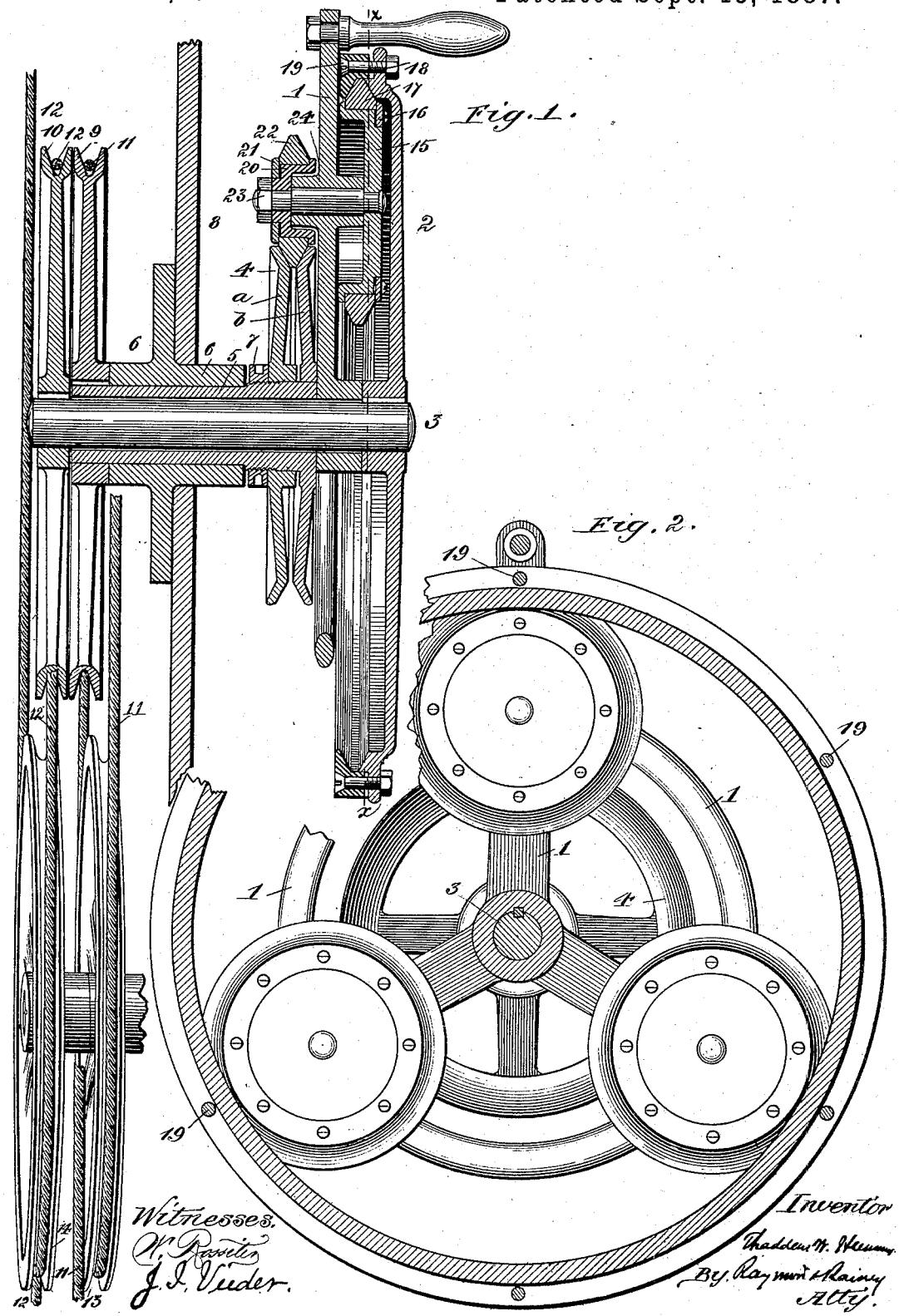

UNITED STATES PATENT OFFICE.

THADDEUS W. HEERMANS, OF CHICAGO, ILLINOIS, ASSIGNOR TO THE CRANE ELEVATOR COMPANY, OF ILLINOIS.

ELEVATOR-VALVE CONTROLLER.

SPECIFICATION forming part of Letters Patent No. 369,936, dated September 13, 1887.

Application filed March 16, 1887. Serial No. 231,122. (No model.)

*To all whom it may concern:*

Be it known that I, THADDEUS W. HEERMANS, of Chicago, in the county of Cook and State of Illinois, have invented certain new and useful Improvements in Means for Controlling the Valves of Elevators, of which the following is a specification.

My invention relates to control-gears which consist of a hand wheel or lever fixed in the car, connected by intermediate gearing and oppositely-revolving sheaves to the control-rope.

In the drawings, Figure 1 is a section through the side of the car and the control-gearing. Fig. 2 is a face view of the hand-wheel 1, Fig. 1, and showing the disk 2 of Fig. 1 on the section-line $x\ x$ of Fig. 1.

The hand-wheel 1 is supported by the shaft 3, which revolves freely therein. The shaft 3 is supported by the sleeve 5, and this in turn by the casting 6, secured to the side 8 of the elevator-car, both sleeve and shaft being free to turn independently of each other.

Upon the ends of shaft 3 are secured the disk 2 and sheave 10, respectively. Upon the ends of sleeve 5 are secured the friction-gear 4 and sheave 9. The spindle 23 revolves in the boss 24 of the hand-wheel 1. On one end of the spindle 23 is the small friction-pinion 20 and on the other is a larger pinion, 15. The small friction-pinion 20 engages with the gear 4; the larger pinion, 15, with the gear or disk 2. There may be only one spindle, 23, with its attached pinions; but to secure smooth working and avoid injurious strains at least two are necessary, and three are preferable. The pinion 20 and gear 4 bear the same proportion to each other as the pinion 15 and gear 2. The pinions 20 and 15 are each provided with detachable rims 22 and 17, composed of rawhide, leather, rubber, or similar material, secured in place by collars 21 and 16. By making the rims as specified friction is increased and wear diminished, and only the rims need be replaced when worn out. The gears 2 and 4 have provisions for regulating the width of the grooves in which the pinions 20 and 15 work, thus governing the friction between them and compensating for wear. This provision in gear 2 consists in a ring, 18, upon the edge of gear 2, said ring having a beveled flange which forms one side of the groove in which the pinion 15 works, and being adjustably secured to gear 2 by bolts 19. The gear 4 is made in two parts, $a$ and $b$, the latter being immovable on the sleeve 5, and the former being adjustable longitudinally on the sleeve 5 by the threaded collar 7.

The sheaves 9 and 10 and idler-pulleys 13 and 14 carry the control-ropes 11 and 12, which may be attached to the valve mechanism in any of the well-known ways. The ropes 11 and 12 are passed around the pulleys and sheaves in opposite directions—that is to say, tracing the course from below upward, the rope 11 (shown as partially broken) passes up over sheave 9 on the side next the observer, down around pulley 13 on the farther side, and up again on the nearer side of pulley 13. The course of rope 12 is upward on the farther side and downward on the nearer side, thence upward again on the farther side, or the reverse of that of rope 11.

The operation is as follows: For the sake of illustration let it be assumed that the car is at rest and that the ropes 11 and 12 are attached to the valve mechanism in such a way as that when the valve is moved one rope will be depressed just as much as the other is elevated, such as would be the case if the ropes 11 and 12 were the two portions of a looped rope passing over a pulley at the extremity of the elevator shaft or way, by the revolution of which the valve was operated. Now, since the ropes pass over the sheaves in reverse directions, such a movement of the ropes would correspond to a revolution of the sheaves 9 and 10 in the same direction. Such a motion would be imparted to the sheaves by turning the hand-wheel 1, which will, by frictional contact of the pinions 15 and 20, move the gears 2 and 4 without the turning of the said pinions on their axis. The car, being thus started, will, in its movement, cause the sheaves 9 and 10 to be revolved in opposite directions by the ropes 11 and 12. The gears 2 and 4 will rotate at equal speeds in opposite directions, and the pinions 15 and 20, being proportional thereto, will revolve on their axis without affecting the hand-wheel. The ropes 11 and 12 will remain stationary so long as the speeds of gears 2 and 4 remain equal; but if one be accelerated while the other is retarded, by turning the hand-wheel the ropes will be shifted, the action of the device being in no way affected by the motion of the car.

I claim—

In a device for controlling the valve of an elevator, the combination of an internal and an external gear, having a common axis, with pinions having a common axle carried by a hand-wheel and meshing with the gears, said gears being connected, respectively, to sheaves, around which are passed the control-rope in reverse directions, substantially as described.

THADDEUS W. HEERMANS.

Witnesses:
P. H. T. MASON,
J. I. VEEDER.